INVENTORS.
Lloyd Edward Lefevre
Peter Breidt, Jr.

Robert B. Ingraham
AGENT

Sept. 15, 1970   L. E. LEFEVRE ET AL   3,528,130
EXTRUSION APPARATUS
Original Filed July 22, 1965   2 Sheets-Sheet 2
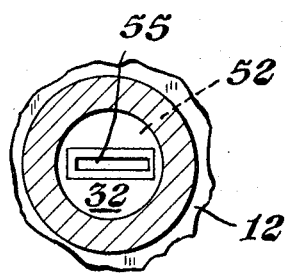
Fig. 2
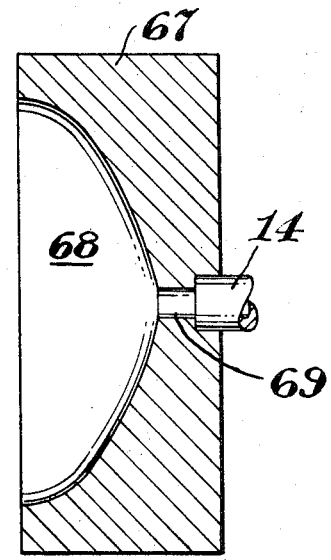
Fig. 4
Fig. 3
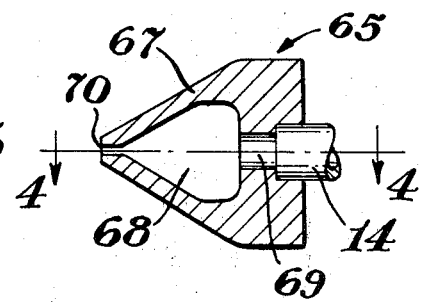
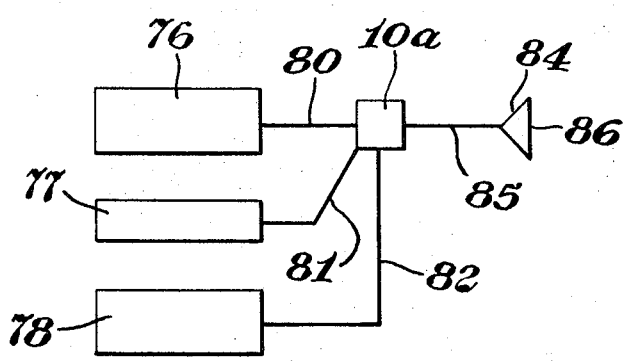
Fig. 5
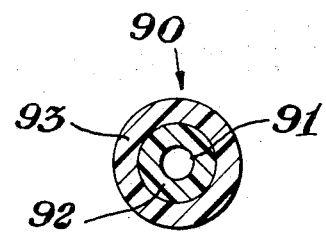
Fig. 6
INVENTORS.
Lloyd Edward Lefevre
BY Peter Breidt, Jr.
Robert B. Ingraham
AGENT United States Patent Office 3,528,130
Patented Sept. 15, 1970

3,528,130
EXTRUSION APPARATUS
Lloyd Edward Lefevre, Bay City, and Peter Breidt, Jr., Midland, Mich., assignors to The Dow Chemical Company, Midland, Mich., a corporation of Delaware
Original application July 22, 1965, Ser. No. 474,094, now Patent No. 3,479,425. Divided and this application July 18, 1968, Ser. No. 763,034
Int. Cl. B29d 23/04
U.S. Cl. 18—13
4 Claims

ABSTRACT OF THE DISCLOSURE

Apparatus is disclosed for the formation of simultaneously extruded laminar film wherein a composite stream consisting of coaxial streams of plastic is provided, passed to the sheeting die wherein the coaxial stream is deformed to provide a layered sheet.

---

This application is a divisional application of our copending application Ser. No. 474,094, filed July 22, 1965, now Pat. No. 3,479,425.

This invention relates to an apparatus for extrusion and, more particularly, relates to apparatus for the coextrusion of two or more thermoplastic, resinous streams into a composite sheet having a plurality of parallel layers.

It is well known in the art that frequently it is desirable to prepare composite film or sheet from synthetic, resinous materials by the extrusion of these materials from a common die. Various forms of dies with internal slots beneficially may be employed to prepare such products where, in essence, slot dies are incorporated within slot dies and such slot dies fed by extruders providing material in the desired quantity and combination at appropriate temperatures. Such dies are relatively expensive, complex to make and in general are difficult to service.

It would be desirable if there were available apparatus which would permit the coextrusion or simultaneous extrusion of like or unlike polymeric materials in a layered form employing conventional extruders and conventional dies.

It would be further advantageous if there were available apparatus which would permit the coextrusion of a multi-layer sheet or laminate from a conventional sheeting or film die which would provide a product having a generally uniform thickness to the various layers which make up such a product.

It would be further advantageous if such an apparatus were relatively small in size and required relatively small modification to existing equipment.

These benefits and other advantages are achieved in an apparatus in accordance with the present invention which comprises an extrusion adapter which can be inserted between the discharge ends of at least two extruders and a sheeting die, the adaptor comprising a housing, the housing defining at least a first inlet and a second inlet, a first passageway and a second passageway, a first discharge and a second discharge, a first inlet and a second inlet and a first discharge being in communication by means of the first passageway, a second inlet and the second discharge being in communication by means of a second passageway, the first discharge and second discharge being generally coaxially arranged, wherein the first passageway generally surrounds at least a portion of the second passageway.

Further features and advantages of the invention will become more apparent from the following specification taken in connection with the drawing wherein:

FIG. 2 is an end view of the apparatus of FIG. 1 taken along the line 2—2 of FIG. 1;

FIG. 3 is a sectional view of a die suitable for use with the apparatus of FIG. 1; and FIG. 4 is a sectional view of the die of FIG. 3 taken along the line 4—4.

FIG. 5 is a schematic representation of apparatus of the invention in use.

FIG. 6 is an alternate arrangement of feed flow.

Figure 1:
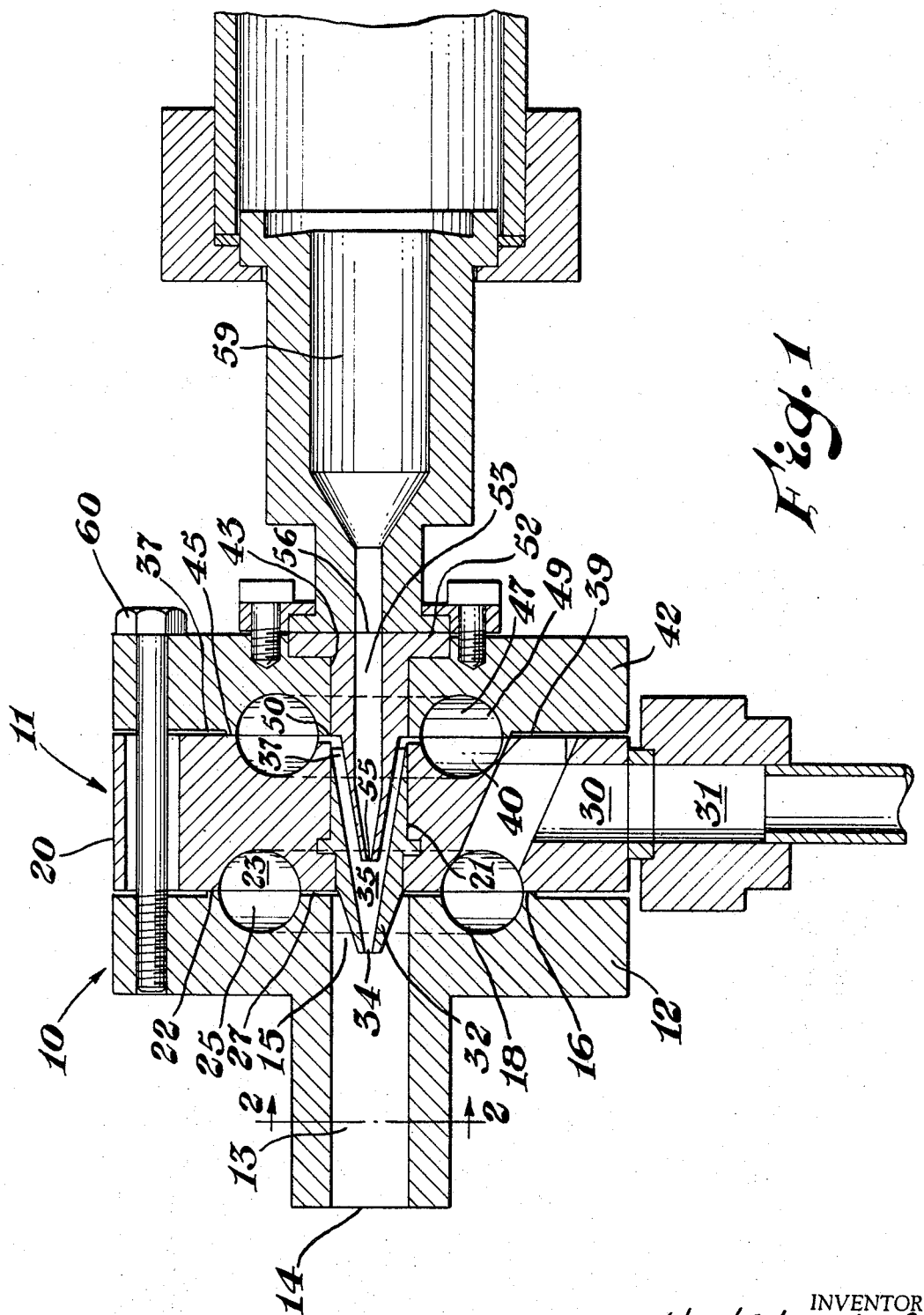
FIG. 1 is a sectional view of an apparatus in accordance with the invention.

In FIG. 1 there is illustrated an apparatus generally designated by the reference numeral 10. The apparatus 10 comprises in cooperative combination a housing generally designated by the reference numeral 11. The housing 11 comprises a first body piece 12. The body piece 12 defines an internal cylindrical passageway 13 generally coaxial with the body 12. The passageway 13 has a discharge end 14 and an inlet end 15. The body portion 12 defines a generally radially extending surface 16 which defines a hemitoroidal recess 18. Adjacent to and in sealing engagement with the body portion 12 is a body portion 20. The body portion 20 defines an internal cylindrical passageway 21, a first radially extending surface 22 having defining therein a hemitoroidal passageway 23 adapted to mate with the hemitoroidal passage or groove 18 to form a toroidal plenum 25. The surfaces 16 and 22 adjacent the inlet end 15 of the passageway 13 of the body portion 12 define an annular radially extending passageway 27 providing communication between the toroidal passageway 25 and the cylindrical passageway 13. An inlet passageway 30 is defined by the body portion 20. The inlet passageway 30 terminates in one end at the toroidal plenum 25 and remote from the toroidal plenum at a plastic supply means 31 disposed within the passageway 30 of the housing portion 20 is a bushing or die 32. The die 32 defines an elongate rectangular extrusion orifice 34 in communication with an internal cavity 35. The cavity 35 terminates in a generally cylindrical opening 37 remotely disposed from the elongate rectangular opening 34. The body portion 20 defines a generally radially extending surface 39 generally parallel to the surface 22 and remotely disposed therefrom. The surface 39 defines a hemitoroidal annular cavity 40. A third body portion 42 is disposed adjacent the surface 39 of the second body portion 20. The third body portion 42 defines a generally centrally disposed cavity 43 which is in substantially coaxial relationship with the passageway 13 of the body portion 12 and the pasageway 21 of the body 20. A generally radially extending surface 45 is defined by the body portion 42 and is adapted to engage in sealing engagement a portion of the surface 39 of the body portion 20. The surface 39 of the body portion 20 defines a hemitoroidal annular cavity 47 which is adapted to cooperate with the cavity 40 of the body portion 20 to define a second plenum 49 between the body portions 20 and 42. The surfaces 45 and 39 define a radially extending annular pasageway 50 which provides communication between the passageway 37 and the second plenum 49. A bushing 52 is disposed within the pasageway 43. The bushing 52 defines a centrally disposed passageway 53 which terminates in a generally rectangular extrusion orifice 55 disposed generally adjacent the bushing 32 and a generally circular opening 56 remote from the bushing 32. The circular opening 56 of the passageway 53 is in operative communication with a source 59 of heat-plastified, thermoplastic, synthetic, resinous material. The body portions 12, 20 and 42 are maintained in sealing engagement by the bolts 60 (one shown).

In FIG. 2 there is illustrated a schematic end view of the apparatus 10 taken along the line 2—2 looking into the passageway 13 illustrating the relative location of the bushing 32 and its extrusion orifice 34 and showing the relationship of the extrusion orifice 55 of the bushing 52.

In FIG. 3 there is illustrated one embodiment of a die generally designated by the reference numeral 65 which is suitable for use with the apparatus 10. The die 65 comprises a housing 67 having defined therein an internal cavity 68. A passage 69 provides communication between the cavity 68 and the exterior of the die 67. The cavity 68 terminates in an extrusion orifice 70 which is an elongate slot particularly suited for the extrusion of a sheet of material entering into the passage 69. The discharge end 14 is shown in sealing engagement with the die housing 67 or in communication with the passage 69.

FIG. 4 depicts a view of the die 67 taken along the line 4—4 illustrating the relationship between the passageway 19, the cavity 68, and the extrusion orifice 70 defined by the housing 67.

In FIG. 5 there is schematically illustrated an apparatus generally designated by the reference numeral 75 illustrating the operation of the invention. The apparatus 75 comprises a first extruder 76, a second extruder 77, a third extruder 78 or similar sources of heat-plastified, thermoplastic, resinous material. Extruders or polymer souces 76, 77, and 78 are in operative communication with a device 10a such as is illustrated in FIG. 1 by means of the conduits 80, 81 and 82. The discharge portion of the device 10a is in communication with a sheeting die 84 by means of a conduit 85. The sheeting die 84 has an elongate extrusion orifice 86. The orifice 86 and the rectangular internal extrusion orifice such as orifices 34 and 58 are generally co-planar.

FIG. 6 depicts a cross-sectional configuration of a stream generally designated by the reference numeral 90, the stream 90 comprises a first generally circular stream 91, a second generally circular stream 92, disposed about the first stream 91 and a third stream 93 of generally cylindrical form disposed about the stream 92.

The embodiment, of the invention, set forth in FIGS. 1–4 is particularly suited and adapted to produce composite sheet or film having exceptional uniformity of layer thickness from thermoplastic resinous extruded materials and compositions which tend to differ in melt viscosity at the temperatures at which they are extruded. The use of the inner rectangular orifice provides a substantial and significant increase in uniformity of distribution of material across the opening of the die.

In operation of the apparatus of the present invention an apparatus such as the apparatus 10 is incorporated into an assembly such as 75 of FIG. 5 wherein two or more sources of an extrudable material supply extrudable material to the appropriate supply passages of the device 10. A first extrudable material is supplied to the passageway 53 from which it is extruded through the orifice 55 as a rectangular or elongate stream. Extrudable material supplied to the passageway or plenum 49 flows about the bushing 52 and encapsulates the stream issuing therefrom. This composite stream is subsequently extruded from the orifice 34 in a rectangular configuration where it is encapsulated within a material supplied from a third polymer source to the plenum 25. Thus, the stream flowing in the passageway 13 has a configuration (assuming extrusion at constant linear velocity of all streams) generally identical to the configuration of the passage and orifices illustrated in FIG. 2. Such a stream on entering a sheeting die, such as the die illustrated in FIGS. 3 and 4, maintains its layered configuration and the outer material supplied from plenum 25 through the annular passageway 27 is deformed from a circular configuration to a rectangular configuration as it moves toward the extrusion orifice 70. The deformation appears to occur largely in the exterior or circular stream in the conduit 13 and the extrudable materials of the inner stream or streams, maintains its configuration and is distributed generally uniformly across the width of the die. Beneficially the position of the inner layer and the relating thickness of the outer layers is readily altered by positioning the inner extrusion orifices such as orifice 34 in other than coaxial position relationship with the passage 13, this is readily accomplished by loosening the bolts 60 and repositioning the housing portion 20 radially and/or about the axis of the passageway 21.

As is readily apparent, the apparatus in accordance with the invention may be utilized for the preparation of sheeting having 1, 2 or 3 components therein, the number of components depending upon the number of streams fed into the apparatus such as the apparatus 10. If desired, housing portions such as the housing portion 20 may be added to the assembly to permit the preparation of film having 4, 5 or even more components as may be desired. The relative dimension of the various layers appearing in the extruded product is readily controlled within reasonable limits by varying the feed rate of the various polymer sources. For example, if it is desired to maintain a relatively thick inner layer, the material from the source 59 of FIG. 1 would be supplied at a substantially higher rate than material from the plenum 49, thus providing a thick inner layer, a thin intermediate layer, and an outer layer proportional in thickness to the feed rate from the plenum 25. In extrusion of sheeting, it is necessary that a suitable temperature for extrusion be maintained for the material in the outer layer. The inner layer or layers may be extruded under conditions which would not normally result in a satisfactory product, as the surface finish of the sheet or film is dependent primarily upon the conditions employed for the extrusion of the outer layer. However, the temperatures of the material forming the inner layers must be sufficiently high to permit extrusion under reasonable pressures and rates. However, the normal temperature tolerance is substantially and significantly increased. Employing an apparatus substantially as shown in FIG. 1 in cooperation with supplies of diverse polymeric material, multi-layer, thermoplastic, resinous film of several varieties is readily produced.

The embodiment of FIG. 6, which is readily achieved by altering the orifice such as 34 and 55 to a circular configuration is generally employed when the flow viscosities of the various layers are relatively close. Often times for many composite sheets, it is not essential that a uniform distribution of the diverse materials be obtained across the width of the sheet and the streams having generally concentric circular configuration is satisfactory. Two, three or more component multi-layer sheets are readily prepared using the essential coaxial feed arrangement depicted in FIG. 6 with a wide variety of sheeting dies.

Generally it is advantageous to employ a sheeting die having an internal cavity which is deep relative to the width of the extrusion slot, in order that adequate spreading of the stream is obtained, however, satisfactory composite sheets have been prepared utilizing dies which are relatively short or shallow, that is the distance from the feed port to the die opening is short relative to the length of the extrusion orifice.

Employing the arrangement, of the present invention, including the embodiment of FIGS. 1–4 and also the feed arrangement as shown in FIG. 6, satisfactory composite films and sheets have been prepared employing diverse combinations as polyethylene-polypropylene wherein the polypropylene is centrally disposed within the polyethylene, polyethylene encapsulating a vinylidene chloride-vinyl chloride polymer, polyethylene encapsulating polystyrene, polyethylene encapsulating a layer of a copolymer of 25 percent ethyl acrylate and 75 percent ethylene which in turn encapsulates a copolymer of vinylidene chloride and vinyl chloride. The composite films and sheets prepared employing the embodiment of FIGS. 1–4 generally exhibit the most uniform distribution of material throughout the width of the sheet. Although the die illustrated in FIGS. 3 and 4 is relatively deep, that is the distance from the die lips to the rear of the cavity, is greater relative to the width of the extrusion orifice, much shorter dies may be employed.

What is claimed is:

1. An extrusion adaptor adapted to be disposed between at least two sources of heat plastified synthetic resinous thermoplastic material and a sheeting die for the preparation of layered composite film, the adaptor comprising:
a housing, the housing defining at least
a first inlet and
a second inlet, the first and second inlets being adapted to communicate with
first and
second sources of heat plastified synthetic resinous material,
a first passageway and
a second passageway,
a first discharge and
a second discharge, the first inlet and first discharge being in communication by means of the first passageway, the second inlet and the second discharge being in communication by means of the second passageway, the first discharge and second discharge being generally coaxially arranged, at least a portion of the first passageway generally surrounding at least a portion of the second passageway and the second passageway terminating within the first passageway, the second passageway discharge having an elongate configuration in a plane generally normal to the axes of the first and second passages, the housing adjacent the second passageway discharge in sealing engagement with
the sheeting die having an elongate discharge slot and the elongate discharge slot of the sheeting die having a major axis which is generally coplanar with the major axis of the second passageway discharge in a plane generally normal to the direction of extrusion.

2. The extrusion adaptor of claim 1 wherein the second discharge has an elongate rectangular configuration.

3. The extrusion adaptor of claim 1 wherein a portion of the first passageway within the housing has a generally annular configuration and is generally symmetrically disposed about the axis of the first passage at a location between the second discharge and the second inlet.

4. The extrusion adaptor of claim 2 wherein a plurality of annular plenums and passageways are in communication with the first passageway.

References Cited

UNITED STATES PATENTS

| | | | |
|---|---|---|---|
| 3,024,494 | 3/1962 | Szpila | 18—13 |
| 3,196,809 | 7/1965 | Nelson et al. | 18—13 XR |
| 3,213,808 | 10/1965 | Schafer | 18—13 |
| 3,222,722 | 12/1965 | Reifenhauser | 18—13 |
| 3,241,503 | 3/1966 | Schafer | 18—13 XR |
| 3,227,103 | 3/1966 | Schafer | 18—13 XR |
| 3,274,646 | 9/1966 | Krystof | 18—13 |
| 3,308,508 | 3/1967 | Schrenk | 18—13 |
| 3,337,914 | 8/1967 | Corbett et al. | 18—13 |
| 3,397,428 | 8/1968 | Donald | 18—13 |

J. SPENCER OVERHOLSER, Primary Examiner